United States Patent [19]

Borrman et al.

[11] Patent Number: 4,578,241

[45] Date of Patent: Mar. 25, 1986

[54] EARTHQUAKE-PROOF FUEL ASSEMBLY

[75] Inventors: Bo Borrman; Erik Hellman; Nils Lundin; Bengt Ode, all of Västerås, Sweden

[73] Assignee: AB ASEA-ATOM, Sweden

[21] Appl. No.: 641,073

[22] Filed: Aug. 15, 1984

Related U.S. Application Data

[63] Continuation of Ser. No. 362,411, Mar. 26, 1982, abandoned.

[30] Foreign Application Priority Data

May 15, 1981 [SE] Sweden ............................ 8103956

[51] Int. Cl.$^4$ ............................................. G21C 3/32
[52] U.S. Cl. ..................... 376/446; 376/444; 376/352; 376/438; 376/440
[58] Field of Search ............... 376/446, 444, 352, 438, 376/440, 451, 434, 362, 364, 365

[56] References Cited

FOREIGN PATENT DOCUMENTS 1334361  5/1962  France ............................... 376/444

Primary Examiner—Deborah L. Kyle
Assistant Examiner—Dan Wasil
Attorney, Agent, or Firm—Pollock, Vande Sande & Priddy

[57] ABSTRACT

A fuel assembly is disclosed which comprises a fuel channel (1) with square cross-section supported by an inlet sleeve (22) having at its lower part an inlet opening for a flow of coolant flowing through the fuel assembly. The inlet sleeve (22) is made of stainless steel and is mechanically connected to a transition sleeve (21) made of thick zirconium alloy sheet, which is welded to the more thin-walled fuel channel (1).

2 Claims, 4 Drawing Figures

EARTHQUAKE-PROOF FUEL ASSEMBLY

CROSS-REFERENCE TO RELATED PATENT APPLICATION

This is a continuation of Ser. No. 362,411 filed Mar. 26, 1982, and now abandoned.

DESCRIPTION

1. Technical Field

The present invention relates to a fuel assembly suited for a boiling water reactor. The fuel assembly comprises a fuel channel made of a zirconium alloy and with substantially square cross-section, the fuel channel surrounding a plurality of vertical fuel rods. The lower end of the fuel channel is welded to a transition sleeve which has an upper end portion with substantially the same cross-sectional form as the fuel channel and a lower end portion with a circular cross-section. The lower end portion of the transition sleeve is mechanically and hydraulically connected to an inlet sleeve with a circular cross-section.

2. Background Art

In prior art fuel assemblies, for example as shown in U.K. Patent Specification No. 931,676, the lower end portion of the fuel channel is arranged to surround an upper end portion, made with a corresponding cross-sectional form, of a thick-walled inlet sleeve, which is made in one piece only, the lower portion of the inlet sleeve being formed with circular cross-section.

The fuel channel is usually made of a zirconium alloy and attached to the inlet sleeve with the aid of a plurality of horizontally directed screws. Calculations have shown that the mechanical connection thus obtained between the fuel channel and the inlet sleeve may constitute a weak spot in a reactor which in other respects is designed with reinforced mechanical constructions with a view to rendering the reactor less vulnerable to earthquakes. This applies particularly when the fuel channel is provided with a centrally arranged stiffening device with four wings, each lying in a vertical plane and spaced from each other at an angular distance of about 90 degrees, each wing being attached to a corresponding side of the fuel channel, for example as shown in the above-mentioned patent specification. Such a stiffening device will counteract the deformation of the fuel channel which often occurs after some time in operation and which may be caused by an internal overpressure in combination with neutron radiation. So, a fuel channel provided with a stiffening device can be made with considerably smaller wall thickness than what would otherwise be needed.

DISCLOSURE OF THE INVENTION

With a design according to the invention, the intention is to provide a reinforced mechanical connection between the fuel channel and the portion of the fuel assembly located below the fuel channel. This is achieved by the fact that the portion of the fuel assembly which supports the fuel channel is constructed in such a way that a weld joint between this portion and the fuel channel can be used.

According to the invention, an inlet sleeve made of stainless steel and a transition sleeve made of a zirconium alloy are provided, and the transition sleeve has an average wall thickness which is greater than the average wall thickness of the fuel channel but smaller than the average wall thickness of the inlet sleeve. The transition sleeve is welded to the fuel channel and detachably attached to the inlet sleeve.

BRIEF DESCRIPTION OF THE DRAWINGS

A preferred embodiment of the invention will be described in the following with reference to the accompanying schematic drawings, in which.

DESCRIPTION OF A PREFERRED EMBODIMENT

Figure 1:
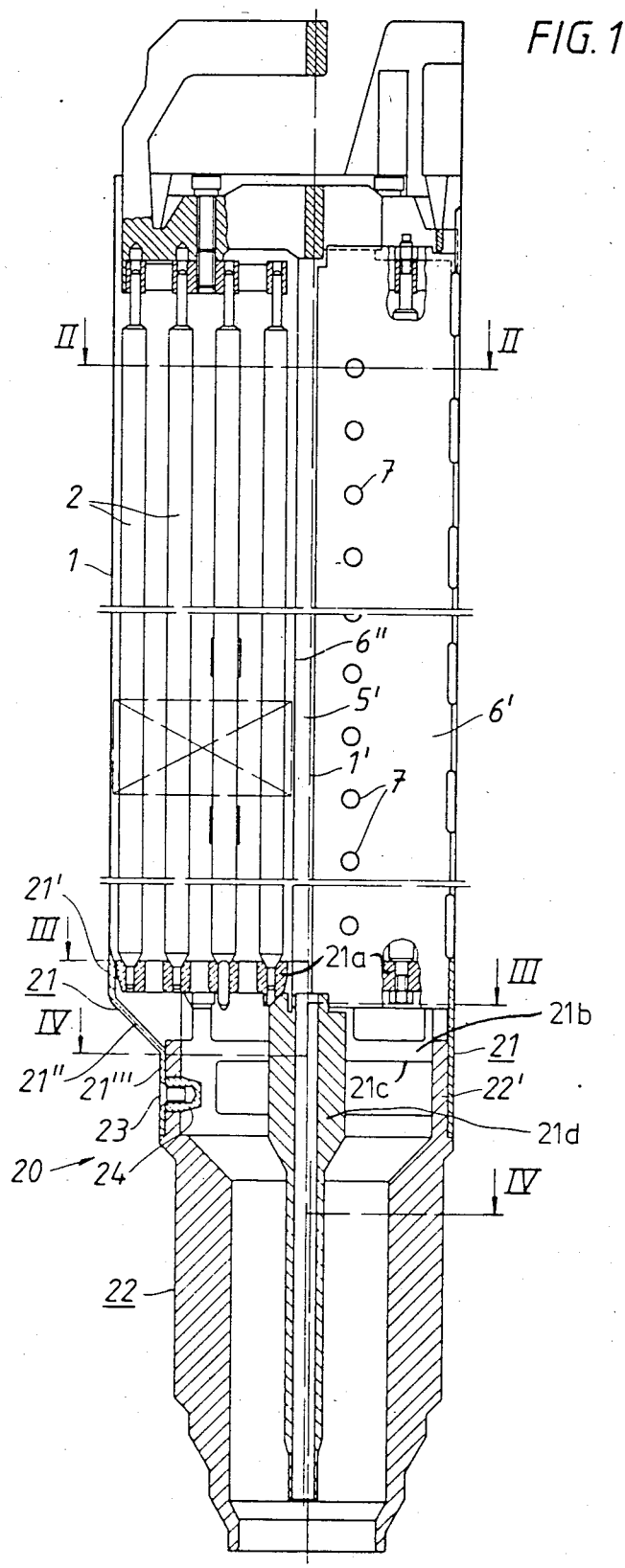
FIG. 1 shows a fuel assembly according to the invention in vertical section along lines I—I of FIGS. 2, 3 and 4. These latter figures show horizontal sections through the fuel assembly along, respectively, lines II—II, III—III and IV—IV of FIG. 1.
Figure 2:
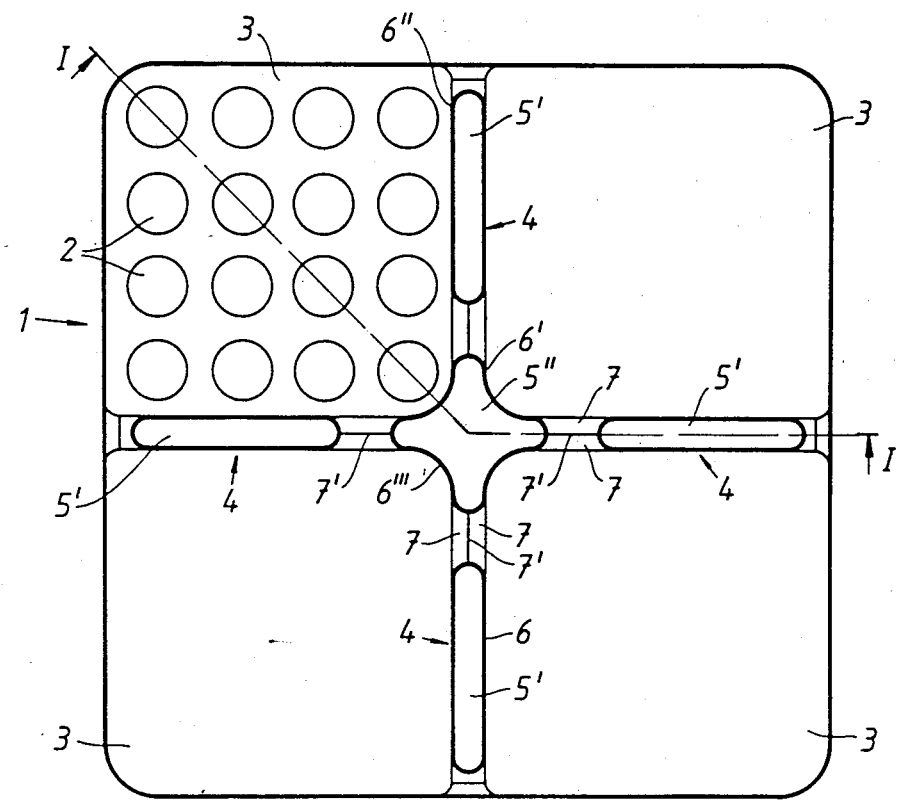

On the drawings, a fuel channel 1 has a substantially square cross-section and a vertical center line 1'. The fuel channel 1 surrounds four groups of fuel rods 2 and is divided into four partial tubes 3 with the aid of a hollow stiffening device. The stiffening device has a vertical center line 4' and four wings 4, the vertical extension of which corresponds to the length of the fuel rods 2. The vertical center line 4' of the stiffening device lies in the vicinity of the vertical center line 1' of the fuel channel. Each wing 4 comprises a vertical passageway 5' for water, which is defined between mutually parallel sheet metal portions and which runs along the entire length of the wing. The cross-sectional surfaces of the passageways 5', together with the flow area of an adjacent central vertical passageway 5", constitute the total channel cross-section of the stiffening device. The stiffening device is composed of four elongated, vertical sheet metal bodies 6, 6', 6" and 6"' of L-shaped cross-section, made of a zirconium alloy. Each stiffening wing 4 comprises two parallel sheet metal portions, arranged in spaced relationship, belonging to two of the L-shaped sheet metal bodies. In each stiffening wing each one of the confronting sheet metal portions is provided with a plurality of inwardly-facing connection pieces 7, each connection piece 7 in one sheet metal portion being directed against and welded to a corresponding connection piece 7 belonging to the other sheet metal portion by means of an annular welding seam 7'. Thus, in each wing 4 a plurality of pairs of welded together connection pieces 7 constitute a plurality of hydraulic connections between two partial tubes positioned on one side each of the wing. Each of the wings is mechanically connected to a corresponding wall of the fuel channel 1.

The fuel channel 1 is made of a zirconium alloy which is suitable for reactor purposes, for example Zircaloy 2 ® or Zircaloy 4 ®. The lower end of channel 1 is welded directly to the upper edge of a Zircaloy transition sleeve 21 which is arranged at its lower end in a detachable hydraulic and mechanical connection to a stainless steel inlet sleeve 22. Also, the wings 4 are directly welded to transition sleeve 21. The transition sleeve 21 is preferably of the same alloy as the fuel channel 1, and has an average wall thickness which is at least 130%, preferably more than 150%, of the average wall thickness of the fuel channel 1. Together, fuel channel 1 and transition sleeve 21 form a shroud for the fuel assembly. Since the transition sleeve 21 is made of the same or approximately the same alloy as the fuel channel 1, it is possible to weld the fuel channel 1 to the transition sleeve with great strength. The transition sleeve 21 has an upper portion 21' made with square cross-section and a lower circular-cylindrical portion 21''' which, together with an intermediate, substantially conical transition portion 21'', constitute integral parts of the transition sleeve 21. The inlet sleeve 22 has an average wall thickness which is considerably greater than the average wall thickness of the transition sleeve 21.

Figure 3:
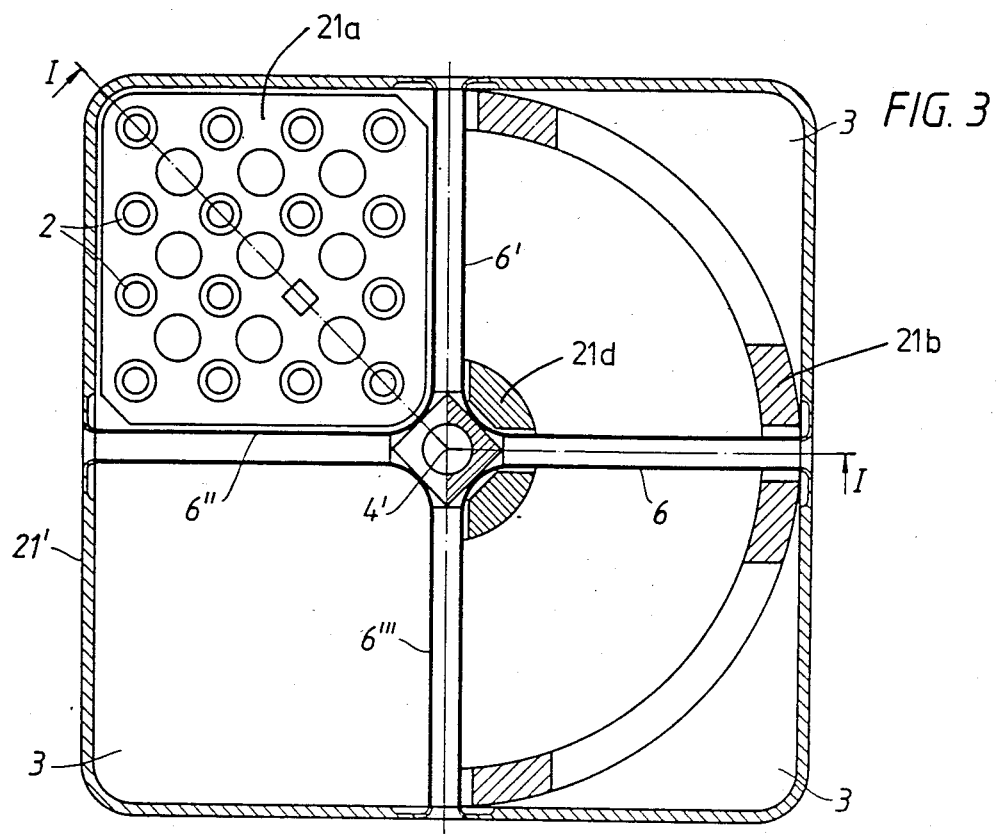
Figure 4:
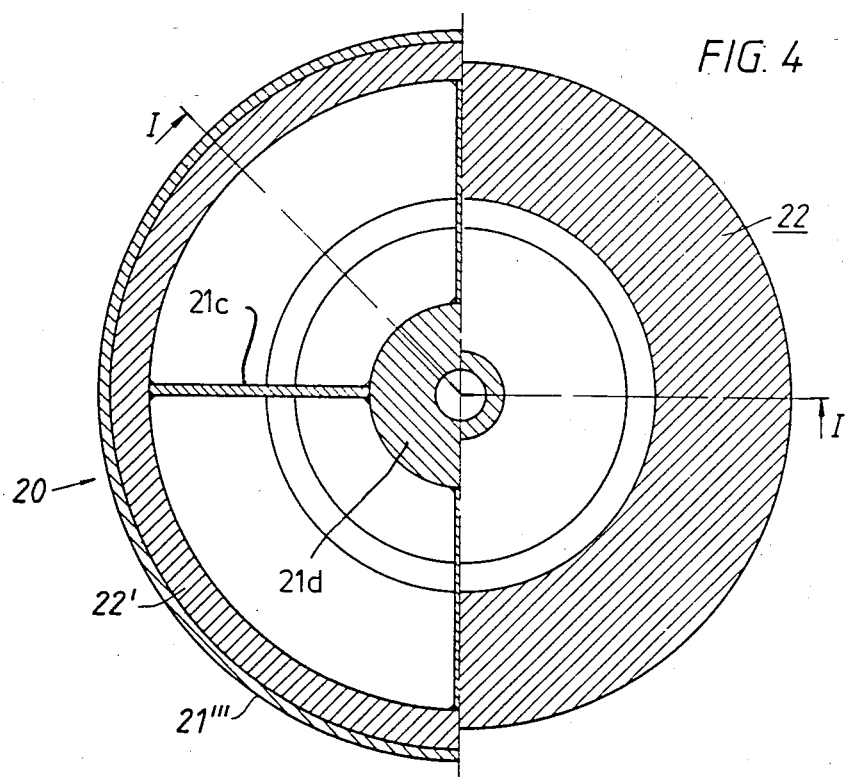

As shown in FIG. 1, the transition sleeve 21 extends upwardly in the fuel assembly to a plane approximately on a level with the lower ends of the fuel rods 2. Above that plane, the fuel rods are surrounded by the thinner fuel channel 1. Within transition sleeve 21 just at the level of the lower ends of the fuel rods and entirely below fuel channel 1, as shown in FIGS. 1, 3 and 4, are bottom grid means 21a which support the fuel rods 2. The bottom grid means 21a in turn are supported by a cylindrical spider assembly 21b having radial arms 21c attached to a central water conduit 21d. Spider assembly 21b is supported by inlet sleeve 22; so that, in effect bottom grid means 21a are supported by the inlet sleeve. The transition sleeve 21 is arranged to surround, with no mentionable play, a corresponding cylindrical portion 22' of the inlet sleeve 22 and is attached thereto by means of a plurality of screws 23, which extend transversely, preferably horizontally as illustrated, to center line 1' and are screwed directly into the material or which are each screwed into a cup-shaped body 24 which is recessed in the cylindrical wall 22' of the inlet sleeve 22 and welded thereto.

Because the average wall thickness of the circular-cylindrical portion 21''' of the transition sleeve 21 is at least 130%, preferably more than 150%, of the wall thickness of the fuel channel 1, the mechanical connection between the relatively thick-walled inlet sleeve 22 and the transition sleeve 21 is considerably stronger than the corresponding connection between the fuel channel and the inlet sleeve of a fuel assembly of a conventional design.

Having thus described our invention in sufficient detail to enable those skilled in the arts to make and use it, we hereby claim as new, and desire to secure Letters Patent for:

1. A fuel assembly for a boiling water reactor, comprising:
   an inlet sleeve (22) of stainless steel;
   an elongated zirconium alloy shroud (1,21) having a vertical center line (1') and a rectangular cross-section along most of its length;
   bottom grid means (21a) supported by said inlet sleeve;
   a plurality of fuel rods (2) supported by said bottom grid means;
   an elongated internal, cruciform stiffening device for said shroud; said shroud enclosing said fuel rods, said bottom grid means and said stiffening device; said stiffening device extending along the entire length of said fuel rods, the vertical center line (4') of said stiffening device lying in the vicinity of said vertical center line of the shroud, said stiffening device having four wings (4) positioned in a vertical plane and arranged at an angular distance of about 90 degrees, each of said wings being mechanically connected to a corresponding wall of the shroud (1, 21);
   said shroud having an upper, relatively thin-walled zirconium alloy fuel channel portion (1) entirely located above the lowest point of said bottom grid means, as well as a lower, relatively thick-walled zirconium alloy transition sleeve portion (21), which surrounds and extends below said bottom grid means, said transition sleeve portion being welded directly to said fuel channel portion and having an average thickness constituting at least 130% of the average thickness of said fuel channel portion, said transition sleeve portion enclosing an upper portion of said inlet sleeve (22) and being secured to said inlet sleeve by means of a plurality of mechanical fasteners (23) inserted horizontally through the wall of said transition sleeve portion into the wall of said inlet sleeve; and each of said wings extending vertically along the whole length of said fuel channel portion (1).

2. A fuel assembly according to claim 1, in which said wings are directly welded to said transition sleeve portion (21).

* * * * *